Patented Aug. 31, 1926.

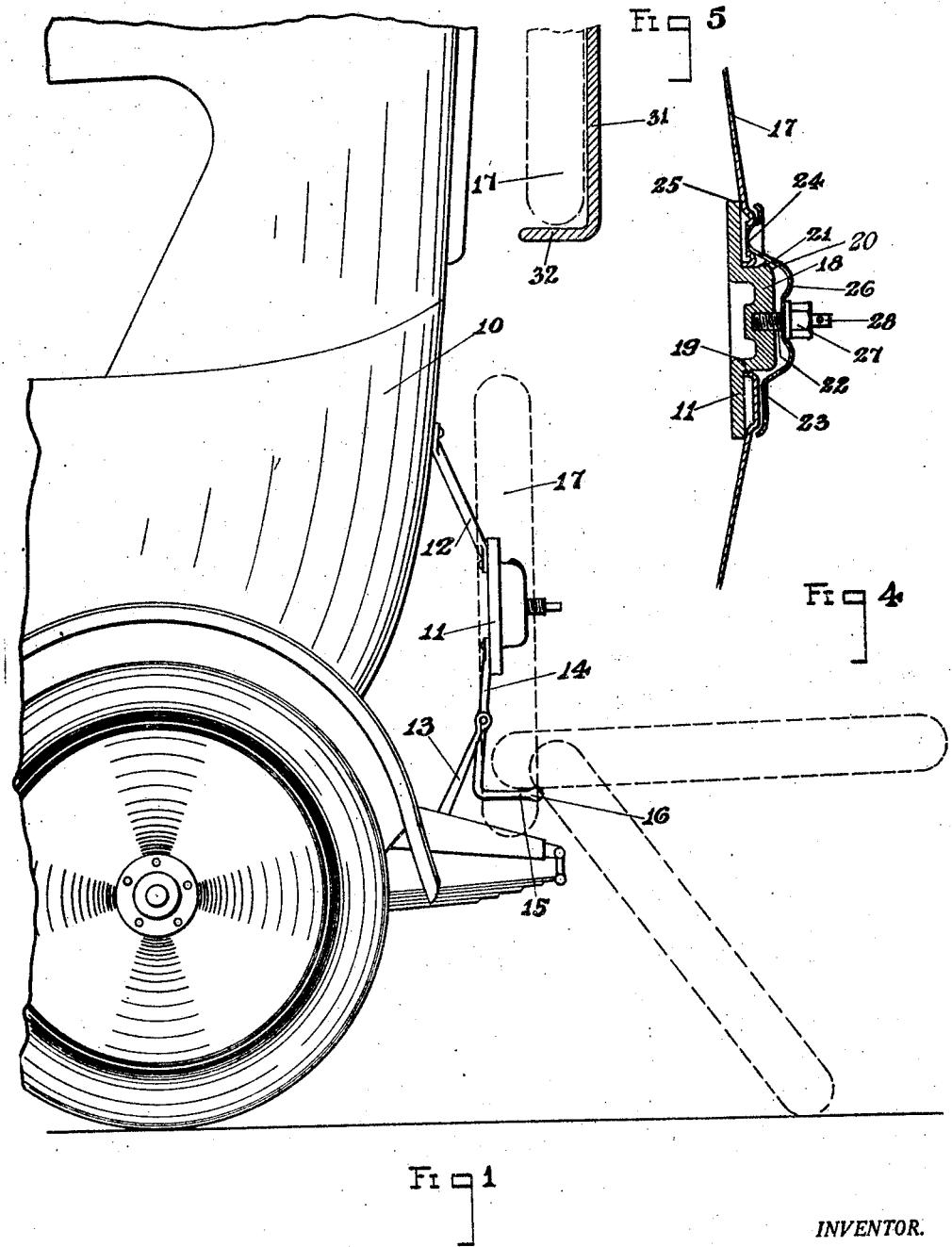

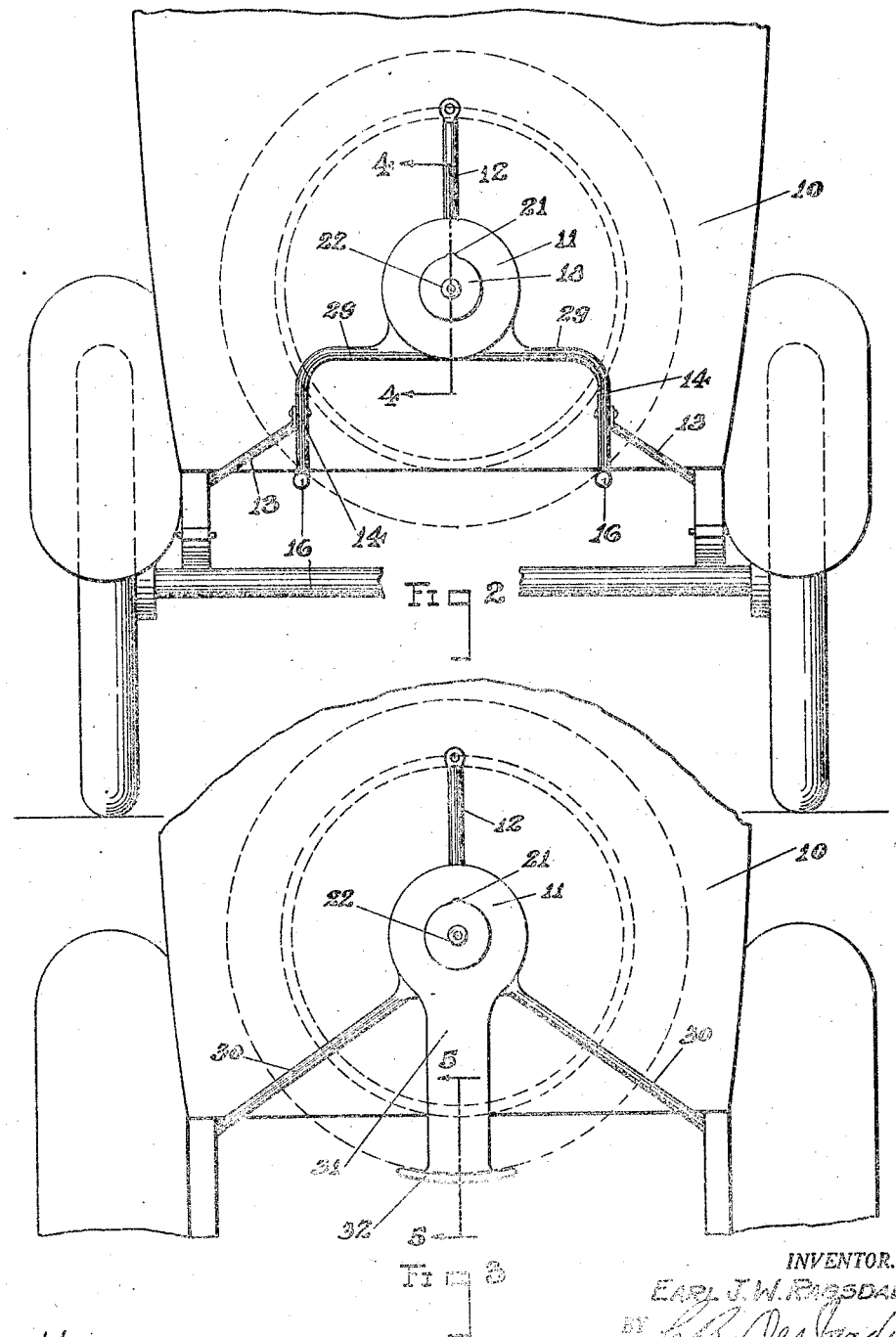

1,597,693

UNITED STATES PATENT OFFICE.

EARL J. W. RAGSDALE, OF NORRISTOWN, PENNSYLVANIA, ASSIGNOR TO BUDD WHEEL COMPANY, OF PHILADELPHIA, PENNSYLVANIA, A CORPORATION OF PENNSYLVANIA.

CARRIER FOR SPARE WHEEL PARTS.

Application filed June 16, 1922. Serial No. 568,835.

My invention relates to improvements in carriers for spare wheel parts and has to do, more particularly, with carriers adapted to be secured to a motor vehicle for holding a spare tire whether by itself, mounted on a spare rim, or mounted on a spare wheel.

The chief object of my invention is to provide such a carrier having means to facilitate the lifting of the spare wheel part into position on the carrier.

A further object of my invention is to provide a carrier having fulcrum means on which the spare wheel part may be fulcrumed to swing it from the ground to carrying position.

Another object of my invention is to provide such a carrier of simple, light and inexpensive construction having means by which the spare tire, rim or wheel may be raised from the ground to carrying position by a lever action so that the operator gains a mechanical advantage in lifting the part from the ground to the carrier.

Another object of my invention is to provide a carrier for spare wheels having a fulcrum upon which the wheel may be swung to carrying position, the wheel itself constituting a lever in such raising movement.

A further object of my invention is to provide a carrier for spare disc wheels having fulcrum means to facilitate the raising of the wheel to carrying position and provided with means automatically operating to retain the wheel in carrying position after it has been raised to such position.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a view, in side elevation, of the rear end of an automobile equipped with my improved carrier, a spare wheel being shown, in dotted lines, in various stages of its movement to carrying position.

Fig. 2 is a view of the carrier in front elevation, a spare wheel being shown, in dotted lines, in carrying position.

Fig. 3 is a similar view showing a slightly modified carrier.

Fig. 4 is a detail, sectional view on line 4—4 of Fig. 2, a portion of the spare wheel being shown in section, and Fig. 5 is a detail, sectional view on line 5—5 of Fig. 3.

In the drawings, the same reference numerals indicate the same parts in the several views, and the sectional views are taken looking in the direction of the arrows at the ends of the section lines.

In general, my invention consists in providing a carrier, for holding or supporting a spare tire, rim or wheel in carrying position on an automobile, having means constituting a fulcrum and so positioned as to be engaged by a part of the tire, rim or wheel when such wheel part is resting on the ground, so that the wheel part may be used as a lever in raising it to carrying position. The carrier is provided with fulcrum means so located that the tire, rim or wheel may rest on the ground with upper portions thereof engaging the fulcrum so that the operator, lifting on the lower part of the tire, rim or wheel, may swing it around said fulcrum to carrying position. When embodied in a carrier for spare wheels, my improved carrier may comprise a dummy hub for supporting the spare wheel in carrying position, and one or more fulcrum arms projecting from the dummy hub in position to be engaged by the upper part of the wheel, when it is standing on the ground in proper alinement with the carrier. In a carrier for spare wheels, my invention may also include a detent or retaining means which catches the spare wheel and prevents it slipping from the dummy hub, after it has been swung about the fulcrum to carrying position.

I have illustrated in the drawings accompanying this specification, a carrier for spare disc wheels which embodies my invention. Referring to the numbered parts of such drawings, the carrier is adapted to be secured to the rear end of an automobile, 10, and includes a dummy hub, 11, which is fastened to and supported from the automobile frame and body by the braces, 12 and 13. The lower portion of the dummy hub, 11, is, in the form shown in Figs. 1 and 2, provided with a pair of laterally and downwardly-extending arms, having the portions, 29, extending laterally and horizontally from the dummy hub, 11, the portions, 14, extending downwardly from the outer ends of the portions, 29, and the rearwardly-projecting, fulcrum portions, 15. The latter terminate in the rounded knobs, 16, to prevent injury to the tire when it fulcrums on the portions, 15, in raising the wheel to carrying position.

The dummy hub, 11, has a central, projecting boss, 18, of such dimensions as to pass through the central opening, 19, in the disc, 17, of the spare wheel, which, in this case, is a disc wheel. The upper edge of this boss is formed with a shoulder, 21, the outer surface of which is beveled, at 20, so that, as the disc wheel is swung to carrying position, the upper edge of the central opening, 19, of the disc, 17, rides over the shoulder, 21, and drops by gravity into seating position behind shoulder, 21, on boss, 18, and is thus prevented from slipping off the dummy hub. The disc wheel is secured in carrying position on the dummy hub, 11, by the following device. The dummy hub, 11, carries a central, threaded stud, 22, which passes through a central opening in the cover and retaining plate, 23. The latter engages the disc, 17, and has projecting bosses, 24, which enter the perforated sockets, 25, of the disc, 17, to keep the wheel from turning on the dummy hub. The central portion, 26, of this retaining plate is dished so as to clear the boss, 19. The retaining plate, 23, is held firmly against the disc, 17, by the nut, 27, which is screwed on the threaded stud, 22. The dishing of the central portion, 26, of the retaining plate gives it a certain resilience so that it acts like a spring washer to prevent unscrewing of the nut, 27. In order to prevent theft of the spare wheel, a padlock shackle may be passed through the hole, 28, in the end of the stud.

One uses my carrier, in lifting the spare wheel to carrying position, in the following manner. The spare wheel is rolled on the ground to a position in the rear of and in line with the carrier, the plane of the wheel being substantially parallel to that of the dummy hub. The upper part of the wheel is allowed to tip forward until it engages the fulcrum portions, 15, of the fulcrum arms carried by the dummy hub. The user now lifts on the lower portion of the wheel and, since the upper portion fulcrums on the parts, 15, the wheel swings around such fulcrum until the boss, 18, passes through the central opening, 19, of the disc, 17. During the last part of this movement the edge of the central opening, 19, engages the bevel, 20, of shoulder, 21, and rides over the shoulder, dropping into seating engagement with boss, 18, behind said shoulder. The fulcrum portions, 15, of arms, 14, are preferably located at such distances from the boss, 18, that, when the wheel is in carrying position, on the hub, 11, the tire on the wheel is out of contact with the fulcrum arms, 15. The latter should be so located, however, that the edge of the opening, 19, will engage the bevel, 20, while the tire on the wheel rests on the fulcrum arms.

It is to be noted that the wheel itself is used as a lever in raising it to carrying position by my invention. The portion of the wheel which contacts with the arms, 15, constitutes the fulcrum of the lever and the effort, of course, is applied at the point or points at which the user grasps the lower part of the wheel. I believe this use of the wheel part as a lever to be broadly novel in connection with carriers of this type.

In Fig. 3, I have shown a slightly modified embodiment of my invention, in which the dummy hub, 11, is supported by the braces, 12 and 30, and has a single, downwardly-extending fulcrum arm, 31, at the lower end of which there is a rearwardly-projecting, curved ledge, 32, on which the wheel is adapted to fulcrum in swinging it to carrying position. In other respects, this embodiment is the same as that previously described.

I have described specific embodiments of my invention in a carrier for spare disc wheels but my invention is broadly applicable to carriers for spare tires, rims or wheels and, therefore, I do not desire to be restricted to carriers for disc wheels. In my application for Letters Patent for carriers for spare wheel parts Serial No. 568,836, filed of even date herewith, I have disclosed and claimed another embodiment of the present invention, but the generic claims to my invention are presented in this application.

Wherever, in the specification or claims, I use the term "wheel part", I mean it to include a tire, a rim, a rim with a tire mounted on it, a demountable wheel, or a demountable wheel carrying a rim and/or a tire.

I am aware that the carriers which I have disclosed specifically in this specification may be changed in many respects without departing from the spirit of my invention and, therefore, I desire to claim my invention broadly, as indicated by the appended claims.

Having thus described my invention, what I claim as new and useful and desire to secure by Letters Patent is:

1. A carrier for a spare wheel part comprising a support for holding a wheel part in carrying position, fulcrum means so located with reference to said support and the ground as to be engageable by the upper peripheral portion of the wheel part when standing on the ground, whereby the wheel part may be fulcrumed on said means to swing it about said portions from the ground to the carrying position, and means whereby, in such swinging movement to carrying position, substantially the entire weight of the wheel part is automatically transferred from the fulcrum means to the support.

2. A carrier for spare wheels comprising a dummy hub for holding the spare wheel in carrying position, fulcrum means so located as to be engageable by a peripheral portion of the spare wheel when resting on the ground, whereby the wheel may be swung on said fulcrum about said portion from the ground to the carrying position and means whereby in such swinging movement to carrying position, substantially the entire weight of the wheel is automatically transferred from said fulcrum means to said dummy hub.

3. A carrier for spare wheels comprising a dummy hub for holding the spare wheel in carrying position, fulcrum means engageable by a peripheral portion of the wheel on which said wheel may be swung about said portion from the ground to carrying position, and means operating automatically to catch and retain the wheel when swung to carrying position on the dummy hub.

4. A carrier for spare wheels comprising a dummy hub for holding the spare wheel in carrying position, fulcrum means carried by said hub and engageable by a peripheral portion of the wheel when resting on the ground to permit the swinging of the wheel on said fulcrum means about said portion from the ground to carrying position, and means on said hub adapted to catch and retain the wheel automatically in carrying position.

5. A carrier for spare disc wheels comprising a dummy hub for holding the wheel in carrying position, and fulcrum means engageable by the wheel on which the wheel may be swung about the portion thereof engaging said fulcrum means from the ground to carrying position, said dummy hub having a retaining shoulder over which the upper edge of the central opening in the wheel disc rides in the movement of said wheel on the fulcrum to carrying position.

6. A carrier for spare disc wheels comprising a dummy hub having a central boss adapted to extend through the central opening in the wheel disc, said boss having a shoulder behind which the edge of said central opening engages to retain the wheel in carrying position, fulcrum means carried by said dummy hub and positioned to be engaged by the wheel, when resting on the ground, to permit the swinging of the wheel on said fulcrum means to carrying position, and means for securing the wheel in such position on the dummy hub.

7. A carrier for spare disc wheels comprising a dummy hub having a central boss adapted to extend through the central opening in the wheel disc, said boss having a shoulder with a beveled approach, the edge of said central opening engaging behind said shoulder to retain the wheel in carrying position on the dummy hub, fulcrum means carried by said dummy hub and positioned to be engaged by the wheel when resting on the ground to permit the swinging of the wheel on said fulcrum means to carrying position, and means for securing the wheel in such position on the dummy hub.

8. A carrier for spare disc wheels comprising a dummy hub having a central boss adapted to extend through the central opening of the wheel disc and to support the latter, a cover plate secured to said boss and engaging the wheel disc to retain the same on the hub, and means carried by said cover plate and engaging the wheel disc to prevent the turning of the same on the dummy hub.

9. A carrier for spare disc wheels comprising a dummy hub having a central boss adapted to extend through the central opening in the wheel disc and to support the latter, a cover plate having projections engaging sockets in the wheel disc, and means for securing the cover plate to the boss on said hub.

10. A carrier for spare disc wheels comprising a dummy hub having a central boss adapted to extend through the central opening in the wheel disc and to support the latter, a threaded stud projecting from said boss, a cover plate having its peripheral portion provided with a plurality of projections engaging sockets in the wheel disc and its central portion dished outwardly to clear the central boss on the hub and perforated to permit the passage of said stud, and a nut screwed on the stud and engaging the dished central portion of said cover plate.

In testimony whereof, I affix my signature.

EARL J. W. RAGSDALE.